Sept. 12, 1967          C. K. STEDMAN          3,341,794

TRANSDUCERS WITH SUBSTANTIALLY LINEAR RESPONSE CHARACTERISTICS

Filed July 26, 1965          2 Sheets-Sheet 1

INVENTOR.
CECIL K. STEDMAN
BY
ATTORNEYS

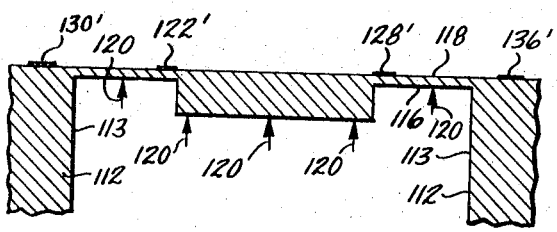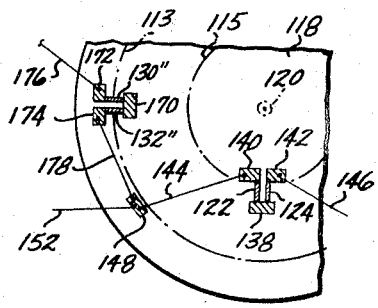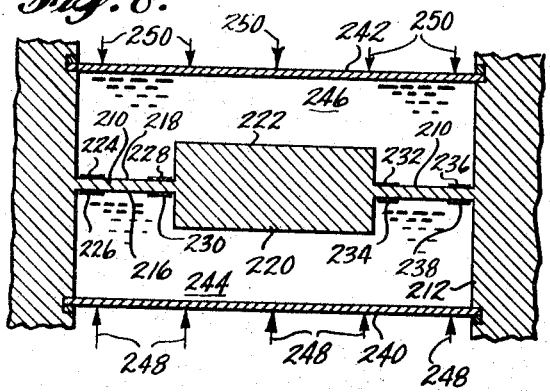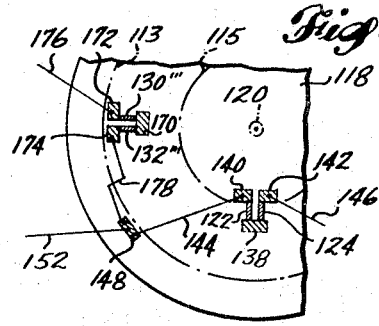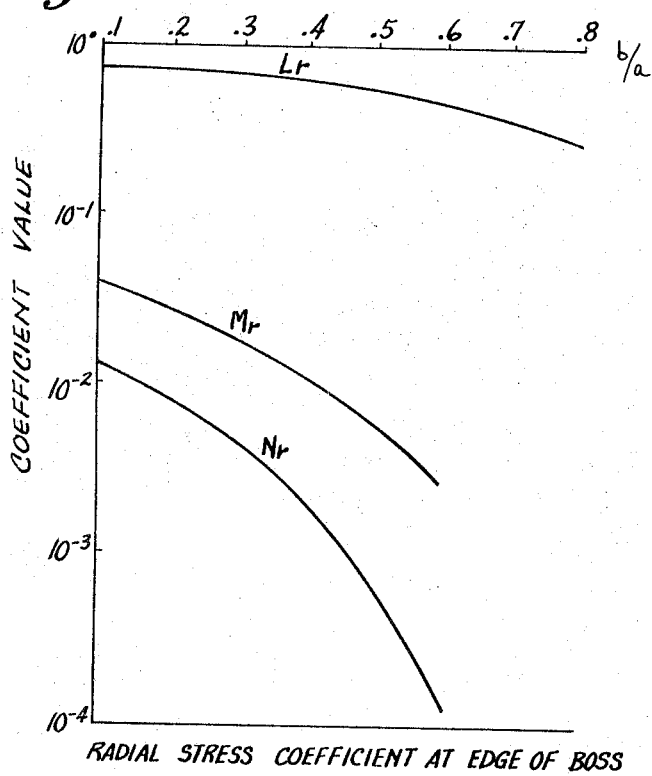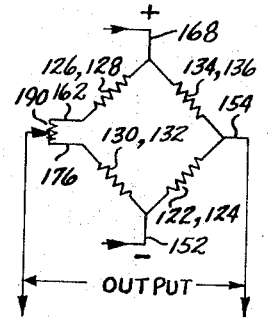

United States Patent Office 3,341,794
Patented Sept. 12, 1967

3,341,794
TRANSDUCERS WITH SUBSTANTIALLY LINEAR RESPONSE CHARACTERISTICS
Cecil K. Stedman, Enumclaw, Wash., assignor to Statham Instruments, Inc., Los Angeles, Calif., a corporation of California
Filed July 26, 1965, Ser. No. 474,590
14 Claims. (Cl. 338—4)

ABSTRACT OF THE DISCLOSURE

Pressure responsive transducers of the clamped diaphragm type, wherein the diaphragm has a centrally disposed rigid boss and an annular flexible area with deposited film strain gage means bonded near the outer and/or inner edges of such flexible area and connected as a Wheatstone bridge. The radius of the central boss is from about 0.3 to about 0.8 and preferably at least about 0.5 the radius of the diaphragm, and the central boss functions to improve and increase the range of linearity of the Wheatstone bridge circuit output in relation to pressure loading on the diaphragm.

---

The present invention relates to the improvement of response linearity in pressure responsive devices and the like, also known as transducers, of the type in which strain gage means are bonded to a flexible diaphragm and electrically connected as the active segments or arms of a Wheatstone bridge so that strain sensitive change in electrical resistance of the active segments provides an indication of the extent of flexure of the diaphragm resulting from differential pressure or other force applied to the diaphragm.

More particularly, the present invention relates to clamped diaphragm type transducers and the improvement of response linearity therein by employment of diaphragm configurations and strain gage arrangements providing more linear response characteristics without loss of sensitivity. Specifically, the present invention involves a transducer having a diaphragm having an annular, relatively flexible area surrounding a relatively rigid, centrally disposed boss area, the outer edge of the annular, relatively flexible area being restrained in either a "half-clamped" or a "full-clamped" manner, and having strain gage means bonded to such diaphragm flexible area substantially at one or more edges thereof so as to be responsive to radial components of stress in such diaphragm flexible area. It has been determined that the thickness of the boss area of such a transducer should be at least twice the thickness of the surrounding flexible area, and that the radius of said boss area should be from about 0.3 to about 0.8 the radius of the diaphragm flexible area, a suitable radius ratio in this respect being about 0.5. It further has been determined that a flexible diaphragm with a center boss can be designed to enhance response linearity in various ways, by placement of strain gage means thereon at various selected points near the outer and/or inner edges of the flexible area of the diaphragm. Such placement of the strain gage means can be with all strain gage means under tensional stress, or all under compressional stress, or with the gage means under combinations of tensional and compressional stress. Further, the respective strain gage means can be placed on the diaphragm so as to be non-equally sensitive to stress to thereby further maximize response linearity.

As known, a pressure flexed diaphragm in the conventional form of a flat, edge clamped plate (such as shown in my prior U.S. Patent No. 3,071,745, at diaphragm 26, for example), exhibits response characteristics which to an extent are nonlinear. Several proposals have been made with respect to reducing response nonlinearity in a conventional clamped plate type diaphragm by means of complex geometrical designs in the form of the diaphragm itself, such as by use of circumferentially extending corrugations or offsets. In contrast to these relatively complex design procedures, it is an important advantage and feature of the present invention that the use of a central boss on the diaphragm, coupled with particularized placement of relatively simple strain gage means or bridge arms thereon, retains the production advantages available only from a diaphragm having nominally flat flexural surfaces.

These and other objects, features and advantages of diaphragm configurations and bridge arm arrangements according to the present invention will be apparent from the following more detailed consideration of the various design factors involved. A typical prior art form of transducer assembly having a flat diaphragm, and various typical forms of transducer assemblies embodying the invention are discussed below in conjunction with the accompanying illustrations thereof, wherein like letter and numeral designations refer to like parts, and wherein:

FIGS. 1A and 1B present respective cross-sectional and plan views, somewhat diagrammatic in nature, of a transducer employing a conventional half-clamped, flat diaphragm, with strain gage means placed near-edge and near-center thereof so as to be responsive to directional flexure of the diaphragm, the near-edge strain gage means being subjected to compressional stress and the near-center strain gage means being subjected to tensional stress;

FIG. 1C is a graphical presentation of the radial stress coefficients characteristic of the conventional transducer shown at FIGS. 1A and 1B;

FIGS. 1 and 2 are respective cross-sectional and plan views, somewhat diagrammatic in nature, of a pressure flexed transducer typifying the present invention, employing a diaphragm having a central boss, with a radius of 0.5 the radius of the diaphragm, and with strain gage means situated thereon substantially at the outer edge and substantially at the inner edge of the annular flexible area surrounding the boss;

FIG. 3 is a graphical presentation similar to FIG. 1C, showing the comparable magnitude of the radial stress coefficients characterizing the boss-reinforced diaphragm shown at FIGS. 1 and 2;

FIG. 4 is a schematic of a typical Wheatstone bridge circuit employing the strain gage means of the transducer shown at FIGS. 1 and 2;

FIG. 5 is a cross-sectional view of a modified form of transducer according to the present invention with all strain gage means situated to be tensionally stressed;

FIG. 6 is a fragmentary plan view similar to FIG. 2, showing a transducer having the boss-reinforced diaphragm configuration presented at FIGS. 1 and 2, with a modified placement of the strain gage means subjected to compressional stress, such strain gage means in this instance being situated to in part overlap a non-flexed surface of the assembly, such placement being selected to reduce the sensitivity of said compressionally stressed strain gage means and thereby maximize the linearity of the instrument output;

FIG. 7 is a further fragmentary view, similar to FIG. 6, showing a transducer involving further variation as to selective placement of the compressionally stressed strain gage means to reduce the sensitivity thereof, such compressionally stressed strain gage means in this instance being placed substantially inboardly of the outer edge of the diaphragm annular flexible area to provide a reduced sensitivity of the strain gage means subjected to compressional stress and thereby maximize the linearity of the instrument output;

FIG. 8 is a cross-sectional view of a further modified form of transducer according to the present invention, the arrangement in this instance involving a full-clamped diaphragm with a boss configuration extending axially in both directions from the central plane of the annular flexible area surrounding the boss, and with strain gage means situated on both sides and at both the outer edge and the inner edge of the annular flexible portion of the diaphragm; and FIG. 9 is a graphic presentation showing the radial stress coefficients $L_r$, $M_r$ and $N_r$ for various values of $b/a$.

For comparison purposes, FIGS. 1A and 1B illustrate certain structural details of a typical transducer assembly having a conventional half-clamped flat diaphragm of uniform thickness throughout. The graphical presentation of FIG. 1C portrays the various radial stress coefficients characteristic of a diaphragm configuration such as shown at FIGS. 1A and 1B.

The transducer assembly selected for discussion as the conventional form, and illustrated at FIGS. 1A and 1B, is in general similar to that shown at FIG. 8 of my U.S. Patent No. 3,071,745 and can be fabricated in like manner as are the transducer assemblies disclosed in said patent.

In FIGS. 1A and 1B, the diaphragm 10 is formed of a suitable insulating material such as quartz, or formed of a metal such as stainless steel with a thin insulative coating (such as SiO) bonded to the metal surface on at least those portions of the diaphragm to which the bridge pattern is bonded. For clarity, such insulative substrate is not shown in the accompanying illustrations.

The diaphragm 10, as shown in FIGS. 1A and 1B, is edge restrained in a so-called half-clamped manner, a clamping ring 12 being structurally integrated with the diaphragm 10 so taht the edge 14 of the diaphragm 10 is restrained at one surface 16 thereof, with the other surface 18 thereof being nominally planar. Loading of the diaphragm 10, as by a suitable fluid medium in contact with the diaphragm surface 16, is diagrammatically indicated in FIGS. 1A and 1B by the arrows designated 20.

The bridge pattern on the insulated planar surface 18 of the diaphragm 10 is composed of a suitable semi-conductive material or electroconductive material having substantial resistance, such as a film of 75% Si-25% Cr or 80% No-20% Cr, for example, electrodeposited under vacuum on the entire diaphragm surface 18, then electroetched to leave the desired bridge pattern. As best shown in FIG. 1B, the bridge pattern on diaphragm 10 comprises two circumferentially extending active segments 22, 24 subjected to tensional stress, and two radially extending active segments subjected to compressional stress, the first such compressionally stressed active segment being made up of two segment portions 26, 28, and the second such compressionally stressed active segment being made up of segment portions 30, 32. Respective tensioned segments 22, 24 are joined by respective output connector segments 34, 36 and 38, 40, extending radially beyond the diaphragm edge and provided at their outermost portions with respective chromium film tabs 42, 44 and 46, 48, to which are soldered respective output leads 50, 52 and 54, 56. As will be understood, the respective conductor areas 34, 36, 38, 40 of the bridge pattern, although integrally formed with the active compressional segments 22, 24, are considerably wider than the active segments and provide relatively low resistance in comparison with the resistance of the active segments 22, 24.

The current flow path with respect to the compressionally stressed active segment portions 26, 28 comprises radially extending conductor segment 58, circumferentially extending conductor segment 60, non-stressed conductor segment 62, circumferentially extending conductor segment 64, and radially extending conductor segment 66, the outward portions of segments 58, 66 being respectively provided with chromium or like film tabs 68, 70 to which are soldered respective output leads 72, 74. In like manner, the current flow path for compressionally stressed active segment portions 30, 32 comprises radially extending conductor segment 76, circumferentially extending conductor segment 78, non-stressed conductor segment 80, circumferentially extending conductor segment 82, and radially extending conductor segment 84, said radially extending conductor segments 76, 84 being respectively provided with chromium film tabs 86, 88 to which are soldered respective output leads 90, 92.

For clarity, in FIG. 1A, the cross-sectional view of the bridge arm pattern there provided includes only the compressionally stressed active segments 22, 24 and the tensionally stressed active segment portions 26, 32.

In transducer assemblies involving a flat diaphragm, such as the transducer assembly shown at FIGS. 1A and 1B, there is a characteristic response nonlinearity in that as soon as the diaphragm 10 is deflected from its normally flat condition, the applied pressure (arrows 20) not only deflects the diaphragm but also causes a stretching thereof. As a result, the stress induced in the various bridge arms 22, 24 and bridge arm portions 26, 28, 30, 32, in relation to the loading on the diaphragm, is a quite complex relationship, involving both linear and non-linear factors.

The linearity rating of a given pressure transducer is customarily given in terms of the variation of the response from linear at the mid-pressure, as a percentage of the terminal pressure, i.e. the maximum pressure of the transducer.

Analysis of the factors affecting linearity in an edge restrained diaphragm, and giving primary consideration to the radial component ($S_r$) of the total stress at the surface of the diaphragm, indicates the radial stress $S_r$ is a summation of three components; a linear component which comprises a bending stress coefficient ($L_r$) times the load, a component which comprises a membrane stress coefficient ($M_r$) times the square of the load, and a component which comprises a bending coefficient ($N_r$) times the cube of the load.

More specifically, analysis shows that the three radial stress coefficients $L_r$, $M_r$ and $N_r$ are related to the radial stress component $S_r$ in the following manner:

$$\frac{a^2}{h^2}\frac{S_r}{E}=L_r\left(\frac{p}{E}\frac{a^4}{h^4}\right)+M_r\left(\frac{p}{E}\frac{a^4}{h^4}\right)^2+N_r\left(\frac{p}{E}\frac{a^4}{h^4}\right)^3 \quad (1)$$

$$=L_r q+M_r q^2+N_r q^3 \quad (2)$$

where $$q=\frac{p}{E}\frac{a^4}{h^4}$$

and where $E$=Young's modulus
$a$=plate radius
$h$=plate thickness
$p$=pressure

The magnitude of the parameter $q$ establishes the relative magnitude of the bending stress and the membrane tension and therefor fixes the degree of non-linearity.

The three radial coefficients for an edge clamped flat diaphragm, such as shown at FIGS. 1A and 1B, are presented at FIG. 1C, the coefficients $M_r$ and $N_r$ being in each instance multiplied by a factor of 100 for clarity of presentation.

The corresponding expression for the transverse or circumferential stress $S_t$ is $$\frac{a^2}{h^2}\frac{S_t}{E}=L_t q+M_t q^2+N_t q^3 \quad (3)$$

In the foregoing and subsequent analysis of the stress factors affecting linearity, the convention has been followed of applying pressure to the side of the diaphragm opposite the strain gages, with compressive stress being termed positive and tensile stress negative. The non-linearity is called positive when the output is numerically larger at a given load than the corresponding point on the straight line from a maximum output point to origin. Further, the output of a full four-arm bridge is called positive.

For a bridge arm having a specified mean point on the diaphragm 10, the mean values of the coefficients $L_r$, $N_r$ and $M_r$ over the appropriate range of $r/a$ can be read from FIG. 1C. For example, if the pair of tensionally stressed bridge arms 26, 28 and 30, 32 and the pair of compressionally stressed bridge arms 22, 24 are connected as a full four-arm bridge, and respectively centered at $r/a=0.28$ and $r/a=0.93$, FIG. 1C shows the values of the stress coefficients for the tensionally stressed arms to be:

$L_c=-0.432$
$M_c=-0.0220$
$N_t=+0.0080$ \quad (4)

and the values for the compressionally stressed arms to be:

$L_r=0.580$
$M_r=-0.0146$
$N_r=-0.0064$ \quad (5)

From the left side of Eq. 2 $S_r/E$=strain, and $$\text{strain}=\frac{\Delta R/R}{G}$$

where R is the nominal resistance of the arm and G is the gage factor of the material making up the bridge arms. Hence, if the radially stressed arms 26, 28 and 30, 32 constitute one side of a bridge, their contribution $$\left(\frac{\Delta v}{v}\right)_{\text{radial}}$$

to the output is $$\left(\frac{\Delta v}{v}\right)_{\text{radial}}=\frac{G}{4}\frac{h^2}{a^2}(L_r q+M_r q^2+N_r q^3) \quad (6)$$

The factors G, H and $a$ are the same for the tensionally stressed arms 22, 24 so to investigate the linearity, the constant factor can be dropped and the analysis can deal only with relative values of output given by Relative output$=(L_r q+M_r q^2+N_r q^3)$
$\qquad\qquad +(L_t q+M_t q^2+N_t q^3)$ \quad (7)

If one side of the bridge, the radially stressed arms 26, 28 and 30, 32 for example, has a fraction $f_1$ of its resistance with one set of coefficients and a fraction $f_2$ with a different set $(f_1+f_2=1)$ its contribution can be written $$f_1(L_{1r}q+M_{1s}q^2+N_{1r}q^3)+f_2(L_{2r}q+M_{ar}q^2+N_{2r}q^3) \quad (8)$$

For a numerical example the strain sensitivity of the arcuate conductor portions associated with the radially stressed arms 26, 28 and 30, 32 can be treated as inactive resistances amounting to 35% of the total resistance. Then Eq. 7 becomes Relative output$=0.65(L_r q+M_r q^2+N_r q^3)$
$\qquad\qquad +(L_t q+M_t q^2+N_t q^3)$ \quad (9)

and with numerical values from Eqs. 4 and 5

Relative output$=(0.377q-0.0095^2-0.0042q^3)$
$\qquad\qquad +(0.432q+0.022q^2-0.0080q^3)$ \quad (10)

Values are tabulated as follows:

TABLE 1
[Clamped plate without boss, full bridge]

| $q$ | Compression Arm | | | Tension Arm | | | Relative output | Percent terminal non linearity |
|---|---|---|---|---|---|---|---|---|
| | Linear bending | Membrane tension | Non linear bending | Linear bending | Membrane tension | Non linear bending | | |
| .460 | .1734 | −.00201 | −.000409 | .1987 | .00465 | −.000778 | .3735 | -------- |
| .547 | .2062 | −.00284 | −.00069 | .2363 | .00658 | −.00131 | .4443 | -------- |
| .650 | .2450 | −.00401 | −.001152 | .2808 | .00928 | −.002194 | .5277 | -------- |
| .773 | .2914 | −.005676 | −.00194 | .3339 | .01314 | −.00369 | .6271 | -------- |
| .919 | .3465 | −.00802 | −.003257 | .3970 | .01856 | −.006205 | .7446 | .16 |
| 1.093 | .4121 | −.01135 | −.00548 | .4722 | .02628 | −.01045 | .8833 | .29 |
| 1.300 | .4901 | −.01605 | −.009227 | .5616 | .03718 | −.01758 | 1.0460 | .49 |
| 1.545 | .5825 | −.02268 | −.01549 | .6674 | .05251 | −.02950 | 1.2347 | .79 |
| 1.838 | .6929 | −.03209 | −.02608 | .7940 | .07432 | −.04967 | 1.4534 | 1.23 |
| 2.186 | .8241 | −.04540 | −.04387 | .9443 | .10513 | −.08357 | 1.7007 | 1.94 |
| 2.600 | .9802 | −.0642 | −.0738 | 1.1232 | .1487 | −.1406 | 1.9735 | 3.00 |

As a convenience for computing terminal linearity, successive $q$ values are in the ratio 2¼. The value of terminal nonlinearity for a given $q$ can be obtained by taking the output for a $q$ four steps back in the table and subtracting half the output for the given $q$.

The values in Table 2 below, extracted from Table 1, give the performance of the compressionally stressed arms taken alone. Table 3 similarly gives the tensionally stressed arms taken alone.

TABLE 2

[Clamped plate without boss, compression arm]

| $q$ | Linear bending | Membrane tension | Non-linear bending | Relative output | Percent terminal non-linearity |
|---|---|---|---|---|---|
| .460 | .1734 | −.00201 | −.00041 | .1710 | |
| .547 | .2062 | −.00284 | −.00069 | .2027 | |
| .650 | .2450 | −.00401 | −.00115 | .2399 | |
| .773 | .2914 | −.00568 | −.00194 | .2838 | |
| .919 | .3465 | −.00802 | −.00326 | .3352 | 1.01 |
| 1.093 | .4121 | −.01135 | −.00548 | .3953 | 1.29 |
| 1.300 | .4901 | −.01605 | −.00923 | .4649 | 1.62 |
| 1.545 | .5825 | −.02268 | −.01549 | .5443 | 2.13 |
| 1.838 | .6929 | −.03209 | −.02608 | .6347 | 2.82 |
| 2.186 | .8241 | −.04540 | −.04387 | .7348 | 3.80 |
| 2.600 | .9802 | −.0642 | −.0738 | .8422 | 5.20 |

TABLE 3

[Clamped plate without boss, tension arm]

| $q$ | Linear bending | Membrane tension | Non-linear bending | Relative output | Percent terminal non-linearity |
|---|---|---|---|---|---|
| .460 | −.1987 | −.00465 | .00078 | −.2025 | |
| .547 | −.2363 | −.00658 | .00131 | −.2416 | |
| .650 | −.2808 | −.00928 | .00219 | −.2879 | |
| .773 | −.3339 | −.01314 | .00369 | −.3433 | |
| .919 | −.3970 | −.01856 | .00620 | −.4094 | −.54 |
| 1.093 | −.4722 | −.02628 | .01045 | −.4881 | −.49 |
| 1.300 | −.5616 | −.03718 | .01758 | −.5812 | −.47 |
| 1.545 | −.6674 | −.05251 | .02950 | −.6904 | −.28 |
| 1.838 | −.7940 | −.07432 | .04967 | −.8186 | .00 |
| 2.186 | −.9443 | −.10513 | .08357 | −.9658 | .54 |
| 2.600 | −1.1232 | −.1487 | .1406 | −1.1313 | 1.19 |

Specific attention is next given to a typical transducer assembly configured according to the present invention, the structural arrangement of which is shown at FIGS. 1 and 2, and the radial stress coefficients of which are plotted at FIG. 3. The transducer assembly illustrated somewhat diagrammatically at FIGS. 1 and 2 comprises a diaphragm 110 which is edge restrained in a half-clamped manner by an integral clamping ring 112 or the like, the edge 114 of the diaphragm 110 being restrained at one surface 116 thereof, with the other surface 118 being nominally planar. Diaphragm 110 is configured to have a central boss 111 at least about twice the thickness of the annular portion of the diaparagm 110, and which has a radius $b$ one-half the radius $a$ of the diaphragm 110 ($b/a=0.5$). The stiffening boss 111 functionally reduces the diaphragm flexural area to an annulus defined at its outer edge by an axial projection of the clamping ring inner wall 113, and defined at its inter edge by the axial projection of the boss wall 115. Loading of the diaphragm 110, by a suitable fluid medium in contact with the diaphragm surface 116, is diagrammatically indicated in FIGS. 1 and 2 by the arrows designated 120.

In like manner as the diaphragm 10 shown in FIGS. 1A and 1B, the diaphragm 110 is formed of a suitable insulating material such as quartz, or of a metal such as stainless steel with a thin insulated coating (e.g. SiO) bonded to at least those surface portions to which the bridge pattern and associated conductor elements are bonded. For clarity, such insulative substrate is now shown in FIGS. 1 and 2. Similarly, also, the active arms of the bridge pattern next discussed are suitably composed of a suitable semi-conductive material such as an electrodeposited film of 75% Si-25% Cr bonded to the diaphragm surface 118.

As best shown in FIG. 2, the one arm of the bridge pattern on the surface 118 of the diaphragm 110 comprises two tensionally stressed, radially extending active segments respectively made up of segment portions 122, 124, and segment portions 126, 128, while the opposite arm comprises two compressionally stressed, radially extending active segments, respectively made up of segment portions 130, 132, and 134, 136.

The current flow path for the bridge arm comprising active segments 122, 124, includes a chromium or like metal film tab 138 joining the segments 122, 124, and respective non-stressed chromium tabs 140, 142, to each of which is soldered a respective metal (e.g. Au) conductor wire 144, 146 in turn leading to respective chromium film connector tabs 148, 150, to which are also connected respective output conductor wires 152, 154. Similarly, as shown at FIG. 2, the tensionally stressed active segments 126, 128 are joined by a chromium film tab 156 and terminate in respective non-stressed chromium film tabs 158, 160, to which are soldered respective conductor wires 162, 164, the conductor wire 164 being in turn connected to a chromium film connector tab 166 also having connected thereto an output conductor wire 168. Compressionally stressed active arm segments 130, 132 are likewise interconnected by a chromium film tab 170 and are terminated by respective non-stressed chromium film tabs 172, 174, an output conductor 176 being in turn connected to the connector pad 172, and conductor wire 178 being soldered to interconnect the chromium film tab 174 and the chromium connector tab 148. Likewise, the compressionally stressed active segments 134, 136 are interconnected by a chromium film tab 180 and terminate in respective non-stressed chromium film tabs 182, 184, with a connector wire 186 interconnecting the tab 182 and the connector tab 166, and with a connector wire 188 interconnecting the tab 184 and the connector tab 150. With the bridge pattern thus formed and interconnected, and as will be readily understood by those skilled in the art, the various output conductors 152, 154, 162, 168 and 176 provide a Wheatstone bridge circuit as schematically shown in FIG. 4 with an external zero balancing potentiometer 190 being provided in the usual manner between the output leads 162 and 176 if desired.

For clarity, FIG. 1 shows cross-sectionally only the active segment portions 122, 136, with the connected chromium tab and conductor segment omitted.

As to an appropriate fabrication procedure for the bridge pattern shown at FIG. 2, such can be fabricated in the manner generally disclosed in by above-identified U.S. Patent No. 3,071,745, i.e. by employment of a mask apertured to effect deposition of the active segment portions 122–136, then a second apertured mask to effect deposition of the chromium film tabs 138, 140, 142, 148, 150, 156, 158, 160, 166, 170, 172, 174, 180, 182 and 184, with the various conductor wires 144, 146, 152, 154, 162, 164, 168, 176, 178, 186 and 188 being soldered in place subsequently.

For the case of a diaphragm having a central boss with a $b/a$ ratio of 0.5, (e.g. at FIGS. 1 and 2), analysis reveals that the three radial stress coefficients $L_r$, $M_r$, and $N_r$ are as shown in FIG. 3, the coefficients $M_r$ and $N_r$ being in each instance multiplied by a factor of 100 for clarity of presentation (in like manner as these coefficients are presented in FIG. 1C).

As an illustrative example for analytical purposes of a transducer with a boss reinforced diaphragm wherein $b/a=0.5$, and selecting a placement for the compressionally stressed radial active segments (130, 132 and 134, 136) so that such segments extend from $r/a=0.94$ to $r/a=1.00$, it follows from FIG. 3 that the mean values of the radial stress coefficients of these respective bridge arms are:

$$L_r = 0.48$$
$$M_r = -0.0039$$
$$N_r = -0.00055 \quad (11)$$

The linearity of the response of these compressionally stressed bridge arms is shown by the following table:

TABLE 4

[Clamped plate; b/a=0.5, compression arm]

| q | Linear bending | Membrane tension | Non-linear bending | Relative output | Percent terminal non-linearity |
|---|---|---|---|---|---|
| 1 | .480 | -.00390 | -.00055 | .47555 | |
| 1.25 | .600 | -.00609 | -.00107 | .59284 | |
| 1.50 | .720 | -.00877 | -.00186 | .70938 | |
| 2.00 | .960 | -.01560 | -.00440 | .94000 | .59 |
| 2.50 | 1.200 | -.02434 | -.00859 | 1.16707 | .80 |
| 3.00 | 1.440 | -.03510 | -.01485 | 1.39005 | 1.03 |
| 4.00 | 1.920 | -.06240 | -.03520 | 1.82240 | 1.58 |
| 5.00 | 2.400 | -.09750 | -.0687 | 2.23380 | 2.24 |
| 6.00 | 2.880 | -.1404 | -.1188 | 2.62080 | 3.03 |
| 8.00 | 3.840 | -.2496 | -.2816 | 3.30880 | 5.08 |

Considering further, as an illustrative example, that the tensionally stressed active segments (122, 124 and 126, 128) occupy the region extending from r/a=0.50 to r/a=0.561, from FIG. 3 the mean values of the respective stress coefficients are:

$$L_r = 0.50$$
$$M_r = 0.0057$$
$$N_r = -0.00060 \quad (12)$$

The linearity of the response of these tensionally stressed bridge arms is shown by the following table:

TABLE 5

[Clamped plate, b/a=0.5, tension arm]

| q | Linear bending | Membrane tension | Non-linear bending | Relative output | Percent terminal non-linearity |
|---|---|---|---|---|---|
| 1 | -.500 | -.00570 | .00060 | -.50510 | |
| 1.25 | -.625 | -.00891 | .00117 | -.63274 | |
| 1.50 | -.750 | -.01282 | .00202 | -.76080 | |
| 2.00 | -1.000 | -.0228 | .00480 | -1.01800 | -.38 |
| 2.50 | -1.250 | -.03562 | .00937 | -1.27625 | -.42 |
| 3.00 | -1.500 | -.05130 | .01620 | -1.53510 | -.40 |
| 4.00 | -2.000 | -.09120 | .03840 | -2.05280 | -.41 |
| 5.00 | -2.500 | -.1425 | .0750 | -2.56750 | -.29 |
| 6.00 | -3.000 | -.2052 | .1296 | -3.07560 | -.09 |
| 8.00 | -4.000 | -.3648 | .3072 | -4.05760 | +.59 |

Summating the responses shown by Tables 4 and 5, to show the full bridge output (FIG. 4), output performance is shown by the following table:

TABLE 6

[Clamped plate, b/a=0.5, full bridge]

| q | Compression, rel. output | Tension, rel. output | Net output | Percent |
|---|---|---|---|---|
| 1 | .47555 | .50510 | .98065 | |
| 1.25 | .59286 | .63274 | 1.22558 | |
| 1.50 | .70938 | .76080 | 1.47018 | |
| 2.00 | .94000 | 1.01800 | 1.95800 | .08 |
| 2.50 | 1.16707 | 1.27625 | 2.44332 | .16 |
| 3.00 | 1.39005 | 1.53510 | 2.92515 | .26 |
| 4.00 | 1.82240 | 2.05280 | 3.87520 | .53 |
| 5.00 | 2.23380 | 2.56750 | 4.80130 | .89 |
| 6.00 | 2.62080 | 3.07560 | 5.69640 | 1.35 |
| 8.00 | 3.30880 | 4.05760 | 7.36640 | 2.60 |

The above tables are applicable to any values of p, a and h provided the radial dimension of the bridge active segments remains about the same fraction of a as in the assumed analytical example.

The respective full bridge responses of Tables 1 and 6 can be compared on a uniform basis by assuming a peak stress of 90,000 p.s.i., a gage factor of 2.0, and 1.35% nonlinearity, as follows:

TABLE 7

| Configuration | q max. | a/h | Range, p.s.i. | Output, mv./v. |
|---|---|---|---|---|
| Diaphragm without boss | 1.92 | 21.9 | 250 | 3.2 |
| Diaphragm with boss (b/a=0.5) | 6.00 | 33.4 | 144 | 5.2 |

The superiority of the diaphragm configuration with boss is apparent. If the same instrument is rated at a lower pressure to reduce the output to 3.0 mv./v., the range would be 83 p.s.i., the stress 52,000 p.s.i., and the terminal non-linearity 0.34%.

To relate the q values of the foregoing tables to the ranges of instruments it is sufficiently accurate to deal with only the linear term in Eq. 2. If the clamped plate of FIGS. 1A and 1B is taken as an illustrative example, the peak value of $L_r$ is 0.75 (FIG. 1C) and the maximum acceptable stress level can be called $S_r$ max. Then $$q_{max} = \frac{1}{0.75} \frac{S_{r\,max}}{E} \frac{a^2}{h^2} \quad (13)$$

The corresponding value of p is the range of the instrument, so $$\text{range} = \frac{S_{r\,max}}{0.75} \frac{h^2}{a^2} \quad (14)$$

If a peak terminal nonlinearity is specified, $q_{max}$ is given by Table 1. If a peak stress is also specified then $a^2/h^2$ is given by Eq. 13. Substitution of this value of $a^2/h^2$ in Eq. 14 fixes the range. Conversely, given stress and range, Eq. 14 fixes $a^2/h^2$ and q follows from Eq. 13. The nonlinearity can then be read from Table 1. As a numerical example: a given transducer with a range of 250 p.s.i., a=0.250″, h=0.0108″, and q=2.39, shows by interpolation in Table 1 a nonlinearity of 2.35%.

The amount by which the output of a given instrument must be reduced in order to obtain a specified reduction in nonlinearity follows directly from Table 1. For instance if one desires a 0.5% linearity, q must be 1.3. Since q is proportional to pressure, such instrument would be rated at 1.3/2.39×250=136 p.s.i., with corresponding reduction of output.

Viewing the design considerations in another manner, if the output is to be maintained while the nonlinearity is reduced to some specified figure by redesigning the instrument to have a smaller a/h, the factor by which the range is increased is determined by the formula:

$$q_{max} = \frac{\text{range}}{E} \frac{a^4}{h^4} \quad (15)$$

Elimination of a/h between Eqs. 13 and 15 gives $$q_{max} = \frac{(S_{r\,max})^2}{0.75^2 \text{ range} \times E} \quad (16)$$

It follows that if $S_{r\,max}$ is held constant to provide constant output, the range is inversely proportion to q. Referring to the same numerical example as before, reduction of $q_{max}$ from 2.35 to 1.3 by redesigning the instrument would mean raising the range to 2.39/1.3×250=460 p.s.i.

If design considerations dictate a maximized linearity even to the extent of a sacrifice in output, it is quite advantageous to reduce or even eliminate the contribution of the compressively stressed bridge arms while retaining full response from the tensionally stressed arms. This is because the tensionally stressed arms are considerably superior as to response linearity than the compressionally stressed arms are, as will be observed from a comparison of Tables 4 and 5. The underlying reason for this is that the membrane tension ($M_r$) adds to the stress in the tensionally stressed arms and subtracts from it in the compressionally stressed arms.

The tensionally stressed arms can be made to dominate the bridge output in a variety of ways, consistent with the basic proposition of maintaining bridge balance. FIG. 5 shows one such variation wherein the compressively stressed arms of the bridge pattern in FIG. 2 are located entirely off the diaphragm and are nonstressed, leaving only the tensionally stressed arms as the active arms. Another such variation is shown in FIG. 6, wherein the compressionally stressed arms are moved partly off the flexible diaphragm and thus are only partly stress responsive. FIG. 7 shows yet another such variation, wherein the compressionally stressed arms are moved toward the center of the flexible diaphragm annulus to reduce $L_r$ mean value and thus reduce the stress responsiveness of these arms.

More specifically, in FIG. 5, wherein the diaphragm configuration and bridge pattern are otherwise as shown and discussed with respect to the transducer assembly shown at FIGS. 1 and 2, the tensionally stressed active segments (with only segments 122' and 128' being shown at FIG. 5) are positioned radially of the diaphragm 116 so as to be substantially at the inner edge of the annular flexible portion thereof (in like manner as are the tensionally stressed bridge arm segments 122–128 in FIG. 2), while the bridge arm segments subjected to compressional stress in FIG. 2 (i.e. segments 130–136 in the bridge pattern at FIG. 2) are placed radially beyond the axial projection of clamping ring wall 113 so as to be completely off the flexible annular diaphragm and be nonstressed. Two such arm segments thus placed are shown in FIG. 5 at 130' and 136'. With this arrangement, and although the output of the bridge circuit is halved, the response linearity of the circuit is increased about fivefold, as evident from a comparison of Table 5 and Table 6.

The modified bridge pattern shown in FIG. 6 is also like that shown at FIG. 2 except that in this instance the responsiveness of the compressionally stressed bridge arms is reduced by moving them radially outwardly to span an axially projection of the clamping ring wall 113. Such relocation is shown in FIG. 6 by the location of two of the arm segments, designated 130'' and 132''. In such location, said segments 130'' and 132'' are stress responsive in the portions thereof on the flexible diaphragm, and are substantially non-stressed in the portions thereof outside the flexible diaphragm. With such bridge arm segments only partially stress responsive, their $\Delta R$ contribution to bridge output (and correspondingly their contribution to output nonlinearity) is less and the overall output linearity of the bridge circuit is improved since the more linearly responsive tensionally stressed arm segments 122, 124, dominate the output.

The bridge pattern variation shown in FIG. 7, as indicated, also has as its purpose the improvement of output linearity. With the bridge pattern being like that shown at FIG. 2, except as otherwise indicated, the compressionally stressed segments 130''' and 132''' are moved inboardly to lie wholly inside and be spaced substantially from the axial projection of clamping ring wall 113. In such position, and although wholly stress responsive, said bridge arm segments 130''' and 132''' are located to have a radial stress coefficient $L_r$ mean value substantially less than (e.g. about one-half) the $L_r$ mean value in the case where these compressionally stressed arm segments are placed substantially at the outer edge of the flexible diaphragm (i.e. in the positions occupied by segments 130, 132 in the FIG. 2 bridge pattern). With the dominant radial stress coefficient of these compressionally stressed bridge arm segments 130''' and 132''' thus reduced, the contribution of these arms to bridge output and to bridge output nonlinearity is correspondingly reduced and the overall response linearity of the bridge pattern thus modified is correspondingly increased.

A full-clamped diaphragm with central boss projecting from both diaphragm surfaces can also be employed, consistent with the basic features of the present invention. A typical form of such full-clamped diaphragm is illustrated by FIG. 8, the diaphragm 210 is fully clamped by a clamping ring 212 structurally integrated with and extending at right angles from both surfaces 216, 218 of the diaphragm 210 at the outer edges of said surfaces, and each such surface 216, 218 is configured to have a respective central boss 220, 222 so that the flexible annular portion of the diaphragm 210 is in effect fully clamped at both the inner and outer edges thereof. With the mechanically symmetrical clamping provided by the diaphragm and boss configuration shown in FIG. 8, the flexible annular diaphragm portion can be flexed in either direction, and stress responsive bridge arms or bridge arm segments can be placed on either or both surfaces 216, 218 of the diaphragm 210 and at locations either substantially at the inner edge of the diaphragm flexible portion or substantially at the outer edge of the diaphragm flexible portion, or at both such edge locations. The possibilities as to such bridge arm positions are collectively illustrated in FIG. 8 by the bridge arm active segments designated 224, 226, 228, 230, 232, 234, 236, 238. With strain gage means bonded to both surfaces of the diaphragm 210, and as is customary practice per se, pressure transmitting diaphragms 240, 242 serve to enclose the respective diaphragm surfaces 216, 218 and together with contained liquid (e.g. oil) in the respective chambers 244, 246 serve to transmit the loading pressure to the diaphragm 210, the bidirectional loading capability of this transducer configuration being designated by arrows 248, 250. As will be apparent, with positive pressure applied in the direction indicated by arrow 248, the diaphragm flexible portion will flex upwardly (as viewed in FIG. 8), and strain gage means 226, 228, 232, 238 are tensionally stressed, while strain gage means 224, 230, 234, 236 are compressionally stressed. Conversely, with positive pressure applied in the direction indicated by arrow 250, the state of stress of the various strain gage means is in each instance reversed.

Notwithstanding the relatively increased linearity attributable to a full-clamped form of diaphragm, such as utilized in the transducer shown at FIG. 8, such diaphragm configuration is not considered to be as advantageous as a half-clamped diaphragm form in that a full-clamped annular diaphragm with double boss (e.g. diaphragm 210) is much more difficult to fabricate, particularly as to the forming of bridge patterns thereon.

FIG. 9 graphically presents semi-logarithmic plots of the radial stress coefficients $L_r$, $M_r$ and $N_r$ for various values of $b/a$ in the range 0.1 to 0.8, with theoretically perfect clamping. It is evident from the data shown by these curves that as the ratio $b/a$ increases, the values of the nonlinear coefficients $M_r$ and $N_r$ rapidly become much smaller, and that a relatively large $Nb/a$ ratio gives relatively better linearity. This indication has been confirmed by experimental test of a transducer assembly having $b/a$ ratio of 0.75 with tensionally stressed and compressionally stressed active arms oriented in the manner shown in FIG. 2. This transducer exhibited such a small order of response nonlinearity that the nonlinearity was masked by random variables. At a terminal loading pressure of 128 p.s.i., a standard output loading, the nonlinearity of this transducer was less than 0.2%.

In general, it is considered that the $b/a$ ratio should be at least about 0.3, in order to realize significant improvement in linearity, and should be not more than about 0.8 as a practical upper design limit. Such upper design limit is imposed by considerations as to the dimensional requirements of the radially extending bridge arm segments, and as to machining difficulties encountered when the annular flexible portion of the diaphragm is made relatively small in radial dimension.

From the foregoing, various further modifications, adaptations, and elemental arrangements characteristic of the invention will occur to those skilled in the art to which the invention is addressed, within the scope of the following claims.

What is claimed is:

1. A diaphragm type transducer having substantially linear response characteristics over a wide range of fluid pressure loading, said transducer comprising:
(a) a diaphragm having opposed surfaces and an annular, relatively flexible area surounding a relatively rigid, centrally disposed boss, the said boss area being at least about twice the thickness of said flexible area and the radius of said boss area being at least about 0.3 as large as the radius of said flexible area;
(b) means restraining the outer edge of said flexible edge area;
(c) strain gage means bonded to a surface of such diaphragm flexible area substantially at an edge thereof so as to be responsive to radial components of stress in said surface; and
(d) means for uniformly pressure loading one surface of said diaphragm relative to the other surface thereof to effect flexure of the surfaces of the diaphragm flexible area.

2. A transducer according to claim 1, wherein said means restraining the outer edge of said flexible area comprises rigid means affixed to only one side of said diaphragm and extending axially therefrom.

3. A transducer according to claim 1, wherein said means restraining the outer edge of said flexible area comprises means circumferentially restraining both surfaces thereof.

4. A transducer according to claim 1, wherein the radius dimension of said relatively rigid boss is from about 0.3 to about 0.8 the radius dimension of the outer edge of said annular flexible area.

5. A transducer according to claim 4, wherein the radius dimension of said boss is about 0.5 the radius dimension of said flexible area.

6. A diaphragm type transducer having substantially linear response characteristics over a wide range of fluid pressure loading, said transducer comprising:
(a) a diaphragm having opposed surfaces and an annular, relatively flexible area surrounding a relatively rigid, centrally disposed boss, the said boss being at least about twice the thickness of said flexible area and the radius of said boss being at least about 0.3 as large as the radius of said flexible area;
(b) means restraining the outer edge of said flexible area;
(c) strain gage means bonded to said diaphragm flexible area substantially at the outer edge of a surface thereof so as to be responsive to radial components of stress at such surface outer edge;
(d) strain gage means bonded to said diaphragm flexible area substantially at the inner edge of a surface thereof so as to be responsive to radial components of stress at such surface inner edge;
(e) conductor means electrically connecting such first-mentioned strain gage means and said second-mentioned strain gage means in a Wheatstone bridge circuit; and
(f) means for uniformly pressure loading one surface of said diaphragm relative to the other surface thereof to effect flexure of the surfaces of the diaphragm flexible area.

7. A transducer according to claim 6, wherein such first-mentioned strain gage means and such second-mentioned strain gage means are both situated on said diaphragm flexible area so as to be under tensional stress upon pressure flexure of said diaphragm.

8. A transducer according to claim 6, wherein one such strain gage means is situated to be subjected to tensional stress and the other such strain gage means situated to be subjected to compressional stress upon pressure flexure of said diaphragm.

9. A transducer according to claim 8, wherein one such strain gage means is situated to be less stress responsive than the other such strain gage means and thereby improve the overall response linearity of the bridge circuit output.

10. A transducer according to claim 9, wherein the less responsive strain gage means is situated on said diaphragm so as to be partly on and partly off said diaphragm annular flexible area.

11. A diaphragm type transducer characterized by a substantially linear response over a wide range of diaphragm deflection incident to fluid pressure loading of the diaphragm, said transducer comprising:
(a) a diaphragm having opposed surfaces and an annular, relatively flexible area surrounding a relatively rigid, centrally disposed boss, the said boss area being at least about twice the thickness of said flexible area and the radius of said boss area being at least about 0.3 as large as the radius of said flexible area;
(b) means restraining the outer edge of said flexible edge area;
(c) strain gage means bonded to such diaphragm flexible area in a surface portion of such area subjected only to tensional stress upon flexure of said diaphragm flexible area; and
(d) means for uniformly pressure loading one surface of said diaphragm relative to the other surface thereof to effect flexure of the surfaces of the diaphragm flexible area.

12. A pressure responsive transducer having substantially linear response characteristics over a wide range of fluid pressure loading, said transducer comprising:
(a) a diaphragm having opposed surfaces and an annular, relatively flexible portion surrounding a relatively rigid, centrally disposed boss, the said boss being at least about twice the thickness of said flexible portion and the radius of said boss being at least about 0.3 as large as the radius of said flexible portion;
(b) means restraining the outer edge of said diaphragm flexible portion;
(c) strain gage means bonded to a surface of said diaphragm flexible portion which is tensionally stressed upon pressure flexure of said diaphragm flexible portion;
(d) strain gage means at least in part bonded to a surface of said diaphragm flexible portion which is compressionally stressed upon pressure flexure of said diaphragm flexible portion;
(e) conductor means electrically connecting such first-mentioned strain gage means and said second-mentioned strain gage means in a Wheatstone bridge circuit, such first-mentioned strain gage means having a better response linearity and being more stress responsive than such second-mentioned strain gage means, thereby improving the overall response linearity of said bridge circuit; and
(f) means for uniformly pressure loading one surface of said diaphragm relative to the other surface thereof to effect flexure of the surfaces of the diaphragm flexible area.

13. A pressure transducer characterized by a substantially linear response over a wide range of fluid pressure loading, said pressure transducer comprising:
(a) a diaphragm having opposed surfaces and an annular, relatively flexible portion surrounding a relatively rigid, centrally disposed boss, the said boss being at least about twice the thickness of said flexible area and the radius of said boss being at least about 0.3 as large as the radius of said flexible portion;
(b) means clamping outer edges of both surfaces of said flexible portion;
(c) strain gage means bonded to said diaphragm flexible portion substantially at the outer edge of at least one of the surfaces thereof so as to be responsive to radial components of stress at such surface outer edge;
(d) strain gage means bonded to said diaphragm flexible portion substantially at the inner edge of at least one of the surfaces thereof so as to be responsive to radial components of stress at such surface inner edge;
(e) conductor means electrically connecting such first-mentioned strain gage means and said second-mentioned strain gage means in a Wheatstone bridge circuit; and
(f) means for uniformly pressure loading one surface of said diaphragm relative to the other surface thereof to effect flexure of the surfaces of the diaphragm flexible area.

14. A pressure transducer according to claim 13, wherein said relatively rigid boss projects axially from the inner edges of both surfaces of said diaphragm flexible portion.

References Cited
UNITED STATES PATENTS

| | | | |
|---|---|---|---|
| 2,848,892 | 8/1958 | Hoffman | 338—5 |
| 3,035,240 | 5/1962 | Starr | 338—4 |
| 3,071,745 | 1/1963 | Stedman | 338—2 |
| 3,139,598 | 6/1964 | Ruge | 73—88.5 |
| 3,151,480 | 10/1964 | Schultz | 338—5 |
| 3,269,184 | 8/1966 | O'Connor | 338—4 |
| 3,277,698 | 10/1966 | Mason | 338—2 |
| 3,278,882 | 10/1966 | Love | 338—2 |

RICHARD M. WOOD, *Primary Examiner.*

ANTHONY BARTIS, *Examiner.*

W. D. BROOKS, *Assistant Examiner.*